United States Patent [19]
Beazley

[11] 3,914,399

[45] Oct. 21, 1975

[54] ELEMENTAL SULFUR PRODUCED BY WET OXIDATION OF HYDROGEN SULFIDE

[75] Inventor: Phillip M. Beazley, Littleton, Colo.

[73] Assignee: Marathon Oil Company, Findlay, Ohio

[22] Filed: Dec. 26, 1973

[21] Appl. No.: 428,585

[52] U.S. Cl. ................................ 423/573; 423/226
[51] Int. Cl.² .................................... C01B 17/04
[58] Field of Search .......... 423/571, 573, 575, 226, 423/228; 55/73

[56] References Cited
UNITED STATES PATENTS

| | | | |
|---|---|---|---|
| 2,445,468 | 7/1948 | Blohm et al. | 423/228 |
| 2,472,473 | 6/1949 | Fetterly | 423/573 |
| 2,772,146 | 11/1956 | Pippig | 423/573 |

FOREIGN PATENTS OR APPLICATIONS

| | | | |
|---|---|---|---|
| 841,610 | 7/1960 | United Kingdom | 423/573 |

Primary Examiner—G. O. Peters
Attorney, Agent, or Firm—Joseph C. Herring; Richard C. Willson, Jr.; Jack L. Hummel

[57] ABSTRACT

$H_2S$ and air are bubbled through a mixture of alcohol, e.g., methanol/amine e.g., isopropylamine/oxygen-carrier catechol to produce elemental sulfur which can settle to the bottom of the liquid phase.

6 Claims, 2 Drawing Figures

ELEMENTAL SULFUR PRODUCED BY WET OXIDATION OF HYDROGEN SULFIDE

CROSS REFERENCES TO RELATED APPLICATIONS

The inventor knows of no related U.S. Pat. applications.

BACKGROUND OF THE INVENTION

1. Field of the Invention

The present invention relates to the field of conversion of hydrogen sulfide to elemental sulfur generally classified in U.S. Pat. Office Class 423 subclass 226–228 or 573 or 575.

2. Description of the Prior Art

A search in the U.S. Pat. Office disclosed U.S. Pat. No. 2,987,379 which passes hydrogen sulfide through a mixture of ethylene glycol and dibutylamine (Col. 5, line 26), methanol is disclosed as a possible equivalent for the ethylene glycol (Col. 3, line 27); U.S. Pat. No. 3,099,536, passes hydrogen sulfide through a mixture of methanol and water (Col. 4, lines 61–73); U.S. Pat. No. 3,545,916 contacts hydrogen sulfide with ethyl amine in water (Col. 5, line 5) and discloses iso- propylamine as a possible equivalent to ethyl amine (Col. 2, line 46); less pertinent references which disclose contacting hydrogen sulfide with catechol or other hydroxy benzenes such as phenol are: U.S. Pat. Nos. 1,073,605; 1,850,388; 2,002,357; 2,028,124; 2,163,160; 2,196,281; 2,244,731; 2,259,901; 2,275,294; and 3,716,620.

None of the above prior art recovers elemental sulfur with the simplicity of the present invention. Most involve burning of $H_2S$ to produce $SO_2$, or require high temperatures or require concentrated hydrogen sulfide in the liquid phase, or have other disadvantages.

SUMMARY

General Statement of the Invention

According to the present invention, hydrogen sulfide, e.g., low concentrations of hydrogen sulfide in air or other gaseous effluents from industrial processes, is contacted with a liquid mixture of primary aliphatic amine, alcohol, an oxygen-carrying agent, together with air.

An important advantage of the invention is its ability to convert $H_2S$ directly to essentially pure elemental sulfur by merely contacting the above ingredients.

Utility of the Invention

The invention is obviously highly useful for the processing of industrial effluents containing hydrogen sulfide. It is also useful for the production of elemental sulfur.

Figure 1:
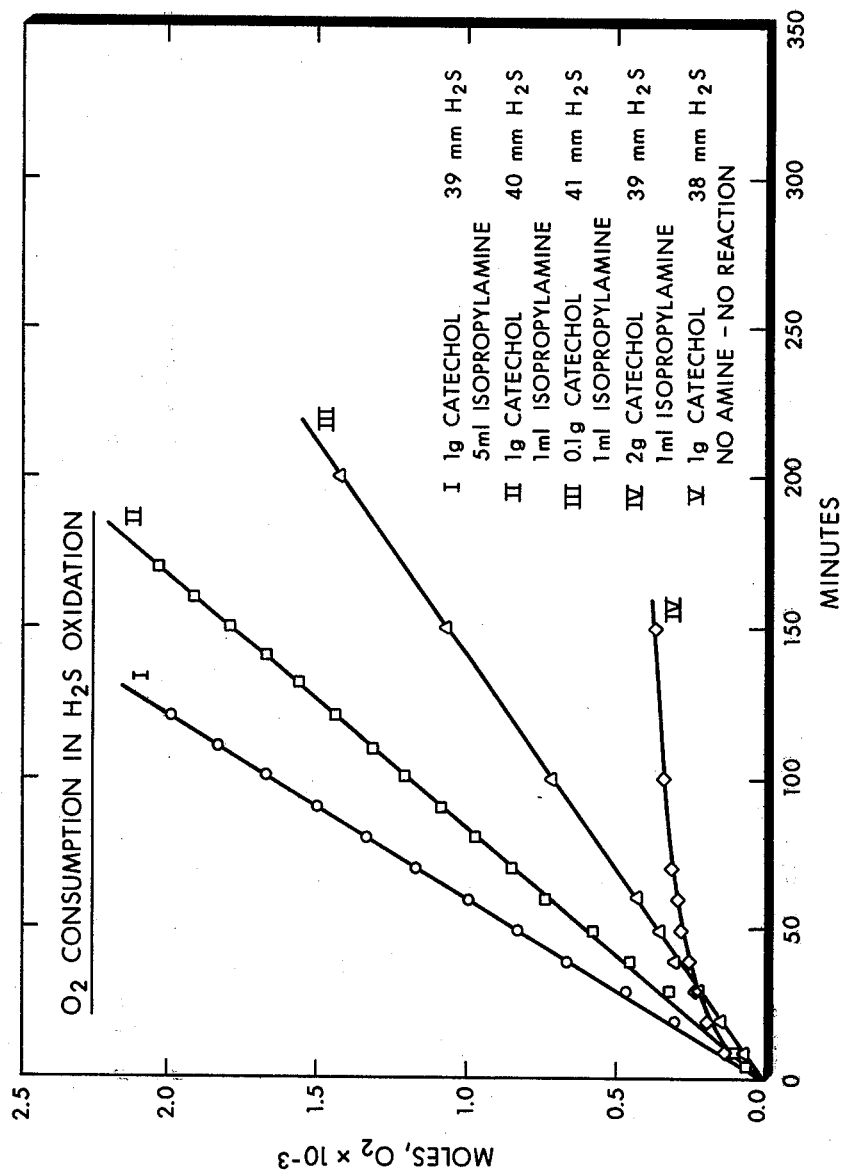
FIG. 1 is a plot of oxygen consumption vs. time. For various ratios of aliphatic amine to oxygen-carrying agent, e.g., catechol, hydroquinone, and tertiary butyl-catechol, in the presence of an excess of $H_2S$.
Figure 2:
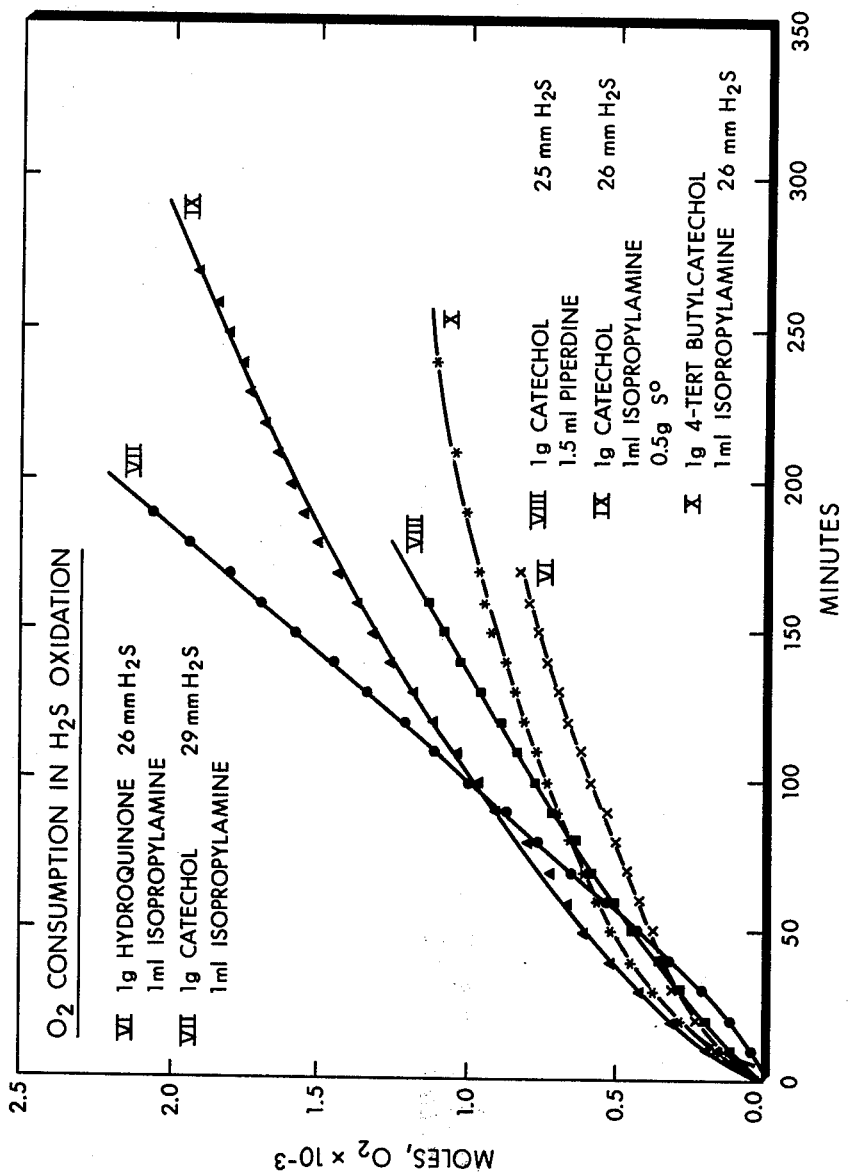
FIG. 2 is a plot similar to that of FIG. 1 but showing different ratios of the above ingredients.

Note that the more preferred combinations result in the more linear graph lines. This also indicates that the oxygen-carrier is being continuously regenerated throughout the experiment.

DESCRIPTION OF THE PREFERRED EMBODIMENTS

Starting Materials

Aliphatic Amines

Any aliphatic amine can be employed so long as it is soluble in the reaction mixture under the conditions employed. The amines preferably contain from about 1 to about 30, more preferably from 1 to about 20, and most preferably from 1 to 10 carbon atoms. Preferably from about 10 to about 100, more preferably about 5 to about 10, and most preferably from 1 to about 5 moles of amine will be present in the reaction mixture for each mole of oxygen-carrier.

Particularly preferred amines include ethyl amine, 2-amino propane, 2-amino butane, 3-aminobutane, tertbutyl amine, 3-aminopetane, isoamyl amine, tertamyl amine, piperdine, and ethanol amine.

Alcohol

The preferred alcohols are aliphatic alcohols, more preferably primary alcohols, and most preferably straight-chain alkanols. The alcohols preferably have from 1 to about 10, more preferably from 1 to about 6, and most preferably from 1 to 3 carbon atoms. Particularly preferred alcohols are methanol, ethanol, and propanol. Preferably there will be present in the reaction mixture from about 10,000 to about 1, more preferably from about 1,000 to about 1, and most preferably from 500 to about 1 moles of alcohol per mole of oxygen-carrier.

Oxygen-Carrier

The oxygen-carrier for use in the present invention can be any of a variety of structures which form reasonably stable structures including oxygen and reasonably stable structures excluding oxygen, e.g., catechol, hydroquinone and dihydroxy benzenes.

Oxygen-containing Gas

The preferred oxygen-containing gas for use with the present invention will, for reasons of economy, be air but air enriched with additional oxygen, refinery streams containing oxygen, and even pure oxygen can be employed with the invention.

In general, the oxygen-containing gas will be added at a rate of from about 0.1 to about 10, more preferably from about 0.2 to about 5, and most preferably from 0.8 to about 1.2 moles of oxygen contained therein per mole of hydrogen sulfide added to the reaction mixture.

Hydrogen Sulfide

The hydrogen sulfide to be utilized with the present invention can be of commercial purity but will, in most cases, where the invention is being employed as an effluent purification system, be impure refinery streams or other effluents containing hydrogen sulfide together with other gases. It will be preferable to remove, if possible, gases which would themselves interract with the other ingredients of the reaction mixture, thus interfering with the principle desired reaction, the conversion of hydrogen sulfide to sulfur and water.

In general, the hydrogen sulfide will be added at a rate of approximately 0.01 to about 20, more preferably from 0.01 to about 10, and most preferably from 0.1 to about 1 liter of hydrogen sulfide per liter of scrubber solution (oxygen-carrier plus alcohol) per minute.

Catalyst

While catalysts are not necessary for the purposes of the present invention, catalysts can, in special occasions where their use would be desired, be employed. The oxygen-carrier, aliphatic amine, and alcohol can themselves be considered to be catalysts in some respects inasmuch as they are not stoichiometrically depleted by the conversion of $H_2S$ to sulfur.

Reaction Media

Reaction media can be employed with the present invention as diluents, but in most cases the reaction mixture will consist essentially of the above three-named ingredients together with the air and hydrogen sulfide.

Temperature

The temperature to be employed with the reactions of the present invention will preferably be from about $-10$ to about 100, more preferably from about 0 to about 60, and most preferably from 10 to about 50°C.

Pressure

The present invention works readily under atmospheric pressure, however the reaction will also run with vacuum or pressurized systems of from about 0.01 to about 1000 pounds per square inch absolute.

Time

The reactions of the present invention are substantially instantaneous, but, in relatively low concentrations, e.g., where the ingredients of the reaction mixture were injected into a pipeline or other relatively large body of liquids contaminated with hydrogen sulfide, reaction times of from about 0.01 to over 100 hours may be employed.

Batch or continuous basis

While the examples describe the invention on a continuous basis, it may, of course, be practiced on a batch basis with intermittent flows and intermittent removal of the products.

Apparatus

While the invention will preferably be practiced in a simple reactor with $H_2S$ and air being sparged into a liquid body composed of the three ingredients, any suitable vessel, e.g., a storage tank, a pipeline through which sour crude contaminated with $H_2S$ is flowing, a scrubber of the bubble cap variety or of the packed column variety or any other liquid-gas contacting apparatus can be employed where desired.

Examples

EXAMPLE I

In this case air containing $6.6 \times 10^{-4}$ volume percent hydrogen sulfide is bubbled into a mixture of 200 ml methanol, 2 ml isopropyl amine, and 0.5 g catechol for several minutes. The reaction mixture is allowed to stand in an open beaker at room temperature for about 12 hours. The reaction solution turns dark orange and free sulfur settles to the bottom. The orange solution is decanted into a gas washing apparatus, and is purged with a gas mixture of 2 liters air and 20.6 mg $H_2S$ per minute for 4 hours. Approximately 5 g of monoclenic sulfur (melting point 119° to 120°C) was recovered. During the purge the effluent gas is checked with lead acetate paper, and no hydrogen sulfide is detected.

EXAMPLE II

The same conditions are used as in Example I, that is room temperature and atmospheric pressure. Hydrogen sulfide gas with $6.6 \times 10^{-4}$ volume percent of hydrogen sulfide in air, is bubbled into the reaction mixture comprising 200 ml methanol, 1 g hydroquinone, and 1 ml isopropyl amine. Free sulfur precipitates to the bottom of the reaction vessel, and the effluent gas contains no detectable $H_2S$.

EXAMPLE III

Under the same conditions as Example I, a hydrogen sulfide gas was added to the reaction mixture comprising 200 ml methanol, 1 g catechol, and 55 ml piperdine. The addition is effected at a rate of 120 liters per hour. The reaction mixture is then stirred, increasing the gas-liquid contact, thus decreasing the amount of time necessary to remove all the hydrogen sulfide gas and convert it to monoclinic slufur. Free sulfur is collected and effluent gas is checked for $H_2S$ with standard laboratory techniques, i.e., lead acetate paper, no $H_2S$ is detected.

EXAMPLE IV

Air containing $6.6 \times 10^{-4}$ volume percent $H_2S$ was purged through a solution of 0.5 g catechol, 3 ml cyclohexylamine, 300 ml ethanol at a rate of 2 liters/min. After 2 hours, no sulfur was produced and $H_2S$ was detected in the effluent.

EXAMPLE V $H_2S$ and air are bubbled into a 500 ml reaction vessel and pumped at a rate of one liter per minute through a 30 cm gas-liquid contact column. The effluent gas then enters a condenser and from there the gas enters a Cd acetate scrubber. The $H_2S$ flow rate is determined by trapping the effluent gas without the scrubber in dilute $NH_4OH$ and then titrating the sulfide with standard $AgNo_3$. The $H_2S$ loss is then determined by weighing the CdS formed in the effluent scrubber. The amine was determined by non-aqueous titration with standard $HClO_4$.

Hydrogen sulfide gas is added to a reaction mixture comprising 10 millimole catechol plus 20 millimole of 1-octylamine plus 500 ml methanol. The addition is effected at a rate of 566 ml per minute for the airflow and approximately 5 ml (0.22 millimole) per minute for the $H_2S$ flow. The reaction was allowed to continue for 6 hours and the total amine loss after this period was 34.4%. The total $H_2S$ delivered as elemental sulfur is 2.42 grams and the sulfur precipitated is 1.60 grams. The scrubbing efficiency is 100%, no CdS is formed in the effluent scrubber.

EXAMPLE VI

Under the same conditions as in Example V wherein the methanol is replaced by 500 ml ethanol, the total amine loss is 29.8%. The total $H_2S$ delivered as elemental sulfur is 2.42 grams and the sulfur precipitated is 1.96 grams. The scrubbing efficiency is 95.4%, the rate of sulfur loss at 4.5 hours is 0.0029 millimoles per minute.

EXAMPLE VII

Under the same conditions used in Example V wherein the methanol is replaced by 500 ml of 1-butanol. The total amine loss in this reaction is 14.0%. The total $H_2S$ delivered as elemental sulfur is 2.465 grams and the free sulfur precipitated is 1.024 grams. The scrubbing efficiency is 67.6%, the rate of $H_2S$ loss at 4.5 hours is approximately 0.0338 millimoles per minute.

EXAMPLE VIII

Under the same conditions used in Example I, a hydrogen sulfide gas is added to the reaction mixture comprising 500 ml ethanol containing 10 millimoles catechol plus 20 millimoles of amine, wherein the amine is 1-octyl amine. The addition is effected at a rate of 566 ml per minute for the airflow and approximately 5 ml per minute for the $H_2S$ flow. The reaction is allowed to run for 6 hours and the total amine loss is 29.8%. The total $H_2S$ delivered as elemental sulfur is 2.42 grams and the sulfur precipitate is 1.96 grams. The overall scrubbing efficiency is 95.4%, the rate of sulfur loss at 4.5 hours is equal to 0.0029 millimole per minute.

EXAMPLE IX

Under the same conditions as Example VIII wherein the amine is 1-methyl heptyl amine. The total amine loss for this reaction is 9.4%. The total $H_2S$ delivered as elemental sulfur is 2.49 grams and the sulfur precipitated is 1.87 grams. The overall scrubbing efficiency is 96.1%, and the rate of sulfur loss at 4 hours is equal to 0.0088 millimole per minute.

EXAMPLE X

Under the same reaction conditions as Example VIII wherein the amine is dibutyl amine. The total amine loss for this reaction is equal to 33.8%. The total $H_2S$ delivered as elemental sulfur is 2.41 grams and the sulfur precipitate equals 0.356 grams. The overall scrubbing efficiency is 56.4%, and the rate of sulfur loss at 4 hours is equal to 0.134 millimole per minute.

EXAMPLE XI

Under the same reaction conditions as Example VIII wherein the amine is triethylamine. The total amine loss in this reaction is 10.3%. The total $H_2S$ delivered as elemental sulfur is 2.51 grams and the sulfur precipitate is equal to 1.04 grams. The overall scrubbing efficiency for this example is equal to 73.5%, and the rate of sulfur lost at 5 hours is equal to 0.0544 millimole per minute.

Modifications of the Invention

It should be understood that the invention is capable of a variety of modifications and variations which will be made apparent to those skilled in the art by a reading of the specification which is to be included within the spirit of the claims appended hereto.

What is claimed is:

1. A process for converting hydrogen sulfide to elemental sulfur comprising forming a mixture of consisting essentially of alcohol, aliphatic amine, and catechol contacting said mixture with $H_2S$ and with oxygen-containing gas and recovering the monoclinic elemental sulfur thus formed wherein from about 1 to about 100 moles of amine are present per mole of catechol.

2. A process according to claim 1 wherein said alcohol is an alkanol having from about 1 to about 3 carbon atoms.

3. A process according to claim 1 wherein said aliphatic amine is selected from the group consisting of aliphatic amines having from about 1 to about 30 carbon atoms.

4. A process according to claim 1 wherein there are present either more or the same number of moles of said aliphatic amine than moles of said oxygen-carrier.

5. A process according to claim 1 wherein the moles of oxygen in the oxygen-containing gas per mole of hydrogen sulfide is preferably from 0.8 to 1.2.

6. A process according to claim 1 wherein the hydrogen sulfide is added at a rate of preferably from 0.1 to about 1 liter of hydrogen sulfide per liter of oxygen carrier and alcohol solution per minute.

* * * * *